(12) United States Patent
Brown et al.

(10) Patent No.: US 9,950,448 B2
(45) Date of Patent: Apr. 24, 2018

(54) IN-MOLD ADJUSTMENT OF PYLSTEER PARAMETERS

(71) Applicants: Joseph Nicholas Brown, Mauldin, SC (US); James Edward Stone, Greer, SC (US); Richard T Janczak, Simpsonville, SC (US)

(72) Inventors: Joseph Nicholas Brown, Mauldin, SC (US); James Edward Stone, Greer, SC (US); Richard T Janczak, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 314 days.

(21) Appl. No.: 14/426,874

(22) PCT Filed: Dec. 6, 2013

(86) PCT No.: PCT/US2013/073460
§ 371 (c)(1),
(2) Date: Mar. 10, 2015

(87) PCT Pub. No.: WO2014/105386
PCT Pub. Date: Jul. 3, 2014

(65) Prior Publication Data
US 2015/0246466 A1 Sep. 3, 2015

Related U.S. Application Data

(60) Provisional application No. 61/746,983, filed on Dec. 28, 2012.

(51) Int. Cl.
*B29C 33/00* (2006.01)
*B29C 33/30* (2006.01)
*B29D 30/54* (2006.01)
*B29D 30/06* (2006.01)

(52) U.S. Cl.
CPC .......... *B29C 33/306* (2013.01); *B29C 33/308* (2013.01); *B29D 30/0681* (2013.01); *B29D 30/54* (2013.01)

(58) Field of Classification Search
CPC .......................... B29C 33/306; B29D 30/0681
See application file for complete search history.

(56) References Cited

U.S. PATENT DOCUMENTS

| | | | |
|---|---|---|---|
| 3,562,861 | A | 2/1971 | Youngblood |
| 5,714,026 | A | 2/1998 | Wakabayashi |
| 5,820,796 | A | 10/1998 | Howald et al. |
| 5,944,082 | A | 8/1999 | Thompson et al. |
| 6,405,772 | B1 | 6/2002 | Suzuki et al. |
| 6,840,296 | B2 | 1/2005 | Suzuki et al. |
| 7,090,735 | B2 | 8/2006 | Neugebauer |
| 2009/0281773 | A1 | 11/2009 | Coe et al. |
| 2012/0067477 | A1 | 3/2012 | Berzins et al. |

OTHER PUBLICATIONS

Ashley, Rich, The Fight Against Tire Noise, Jul. 18, 2013, pp. 1-4, tirereview.com (retrieved online Mar. 31, 2014 <http://www.tirereview.com/the-fight-against-tire-noise/>.

*Primary Examiner* — Timothy Kennedy
(74) *Attorney, Agent, or Firm* — John Steckler Schwab

(57) ABSTRACT

Molds, methods and systems are provided for adjusting one or more plysteer parameters in a tire having a tread formed from a mold.

31 Claims, 8 Drawing Sheets

B    -3
C    -3
A    -3
C    -3
B    -3
A    -3
---
AVERAGE
(6x-3)/6 = -3 N-m

B    -3
C    -3
A+   +2
C    -3
B    -3
A-   -8
---
AVERAGE
= -3 N-m

IN-MOLD ADJUSTMENT OF PYLSTEER PARAMETERS

TECHNICAL FIELD

The presently disclosed invention is generally directed to molds, methods and systems for forming tires. More particularly, the presently disclosed invention is directed to in-mold adjustment of one or more plysteer parameters in the formed tires and consequent adjustment of any tendency for a tire to drift or pull laterally.

BACKGROUND

A tire footprint or tire contact patch may include an area of contact between the tire and a ground-surface upon which the tire operates. The distribution of forces and moments on the tire from the ground surface at the contact patch interface contributes to effective vehicle steering stability and handling. For example, steering pull is manifested as a tendency for a vehicle to drift left or right when the steering wheel is released. This pull is caused by a twisting moment on the tire about a Z-axis normal to the contact patch (hereinafter "aligning torque"), and a lateral force perpendicular to the forward velocity of the vehicle along a Y-axis at the contact patch (hereinafter "lateral force").

In tire design, predicted drift or lateral pull (i.e., to drift or pull sideways as the tire rolls along a desired path) may be a design feature. For example, a tire may be designed to pull toward a road centerline to counteract a crown formed in the road, thereby allowing the tire to roll in a straight line. As shown respectively in FIGS. 9(A) and 9(B), the road crown varies in a right-hand-side driving region (e.g., France, Germany, Korea, USA, etc.) and a left-hand-side driving region (e.g., Australia, Japan, United Kingdom, etc.). Straight turning of a vehicle is a relevant safety feature of vehicle performance. Vehicle manufacturers have therefore established limits on the amount of permissible drift.

Plysteer residual aligning torque ("PRAT") can be used to maintain straight travel on a sloping road (e.g., sloping due to the road's drainage gradient). PRAT is a plysteer parameter that quantifies a tire's tendency to move laterally relative to a rolling direction based upon the creation of a moment or torque acting on the tire by way of the tire footprint. In North America and Europe (i.e., right-hand-side driving regions), an acceptable PRAT is about −3 N-m, although this parameter may vary by road type and vehicle design. In Japan and other left-hand-side driving regions, a positive PRAT may be required.

It is the sum of all plysteer contributions acting within the tire footprint that generates a corresponding PRAT or PRLF during tire operation. Known molds may be designed with elements having equal PRAT contribution as shown by the exemplary mold of FIG. 10. In the mold of FIG. 10, each of exemplary elements A, B, C has an equal PRAT contribution of −3 N-m (such that the overall PRAT contribution of the mold is −3 N-m as established by the average PRAT contribution of the elements). Known molds may also be designed with unequal PRAT contribution. For example, in the mold of FIG. 10, exemplary element A may have an unequal PRAT contribution relative to the contributions of exemplary elements B and C. In certain instances, after a tire construction has been designed to achieve an intended PRAT in conjunction with a particular mold design, the PRAT of the molded tire may still deviate from the intended value. Correction of the PRAT, without effecting any change to the tire construction design, necessitates adjustments to the mold. Major mold investments must be made, and changes after the pattern freeze become very costly not only due to the labor and material required, but also due to the loss in tire production during mold replacement.

An adjustment of PRAT and other plysteer parameters is therefore demanded that reliably predicts such parameters in a molded tire while obviating costly mold replacements.

SUMMARY

A mold is provided for adjusting one or more plysteer parameters in a tire having a tread formed from the mold. The mold includes a plurality of tread-molding elements defining a total plysteer contribution of the mold. The plurality of tread-molding elements includes at least one of one or more removable tread-molding elements with each element having a predetermined plysteer contribution, and at least one alternative removable tread-molding element having a predetermined plysteer contribution that differs from the predetermined plysteer contribution of the one or more removable tread-molding elements. Substitution of at least one of the one or more removable tread-molding elements with at least one alternative removable tread-molding element effects adjustment of the total plysteer contribution of the mold. In some embodiments, substitution of at least one of the one or more removable tread-molding elements with at least one alternative removable tread-molding element effects adjustment of at least one tire noise sequence formed thereby.

In some embodiments, a measured plysteer parameter of the tire is compared with a target plysteer parameter for the tire. The one or more plysteer parameters to be measured and compared include at least one of plysteer residual aligning torque, plysteer residual lateral force and plysteer residual corning force.

Some embodiments of the presently disclosed mold include interchangeable tread-molding elements in which a plysteer contribution of one of the removable tread-molding elements and the alternative removable tread-molding elements increases the total plysteer contribution of the mold. In such embodiments, a plysteer contribution of another of the tread-molding elements and the alternative removable tread-molding elements decreases the total plysteer contribution of the mold. In some embodiments of the presently disclosed mold, at least one alternative removable tread-molding element is configured to form a lateral groove in the tread. The alternative removable tread-molding element may be configured to form a lateral groove in the tread that is different than a lateral groove formed in the tread by the removable tread-molding elements. A difference between lateral grooves may be effected by one of: varying an angle by which each lateral groove deviates from an imaginary reference line extending in a widthwise direction of the tread and normal to a lateral centerline of the tread; and varying an inclination angle of at least one groove side wall of a pair of groove side walls arranged on opposing sides of a lateral groove, In such embodiments, the inclination angle may be measured from an imaginary reference line extending in a depthwise direction of a tread thickness and normal to both a lengthwise direction and a widthwise direction of the tread.

A method is also provided for adjusting one or more plysteer parameters in a tire. The method includes providing at least one mold as presently disclosed herein and forming at least one tire having a tread formed from the mold. The method also includes determining one or more measured plysteer parameters of the tire. The measured plysteer parameters are compared with corresponding target plysteer parameters for the tire. If the measured plysteer parameters differ from the corresponding target plysteer parameters, the total plysteer contribution of the mold is adjusted by substituting at least one of the removable tread-molding elements with at least one alternative removable tread-molding element. In some embodiments, substituting at least one of the removable tread-molding elements with at least one alternative removable tread-molding element effects adjustment of at least one tire noise sequence formed thereby.

Additionally, a system is provided for adjusting one or more plysteer parameters in a tire having a tread formed from a mold. The system includes at least one mold at presently disclosed with each mold having a tread-molding cavity along at least a portion of which a series of interchangeable tread-molding elements is arranged. Substitution of at least one removable tread-molding element with at least one alternative removable tread-molding element effects adjustment of the total plysteer contribution of the mold.

The foregoing and other objects, features and advantages of the invention will become readily apparent from the following detailed description.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION

Figure 1:
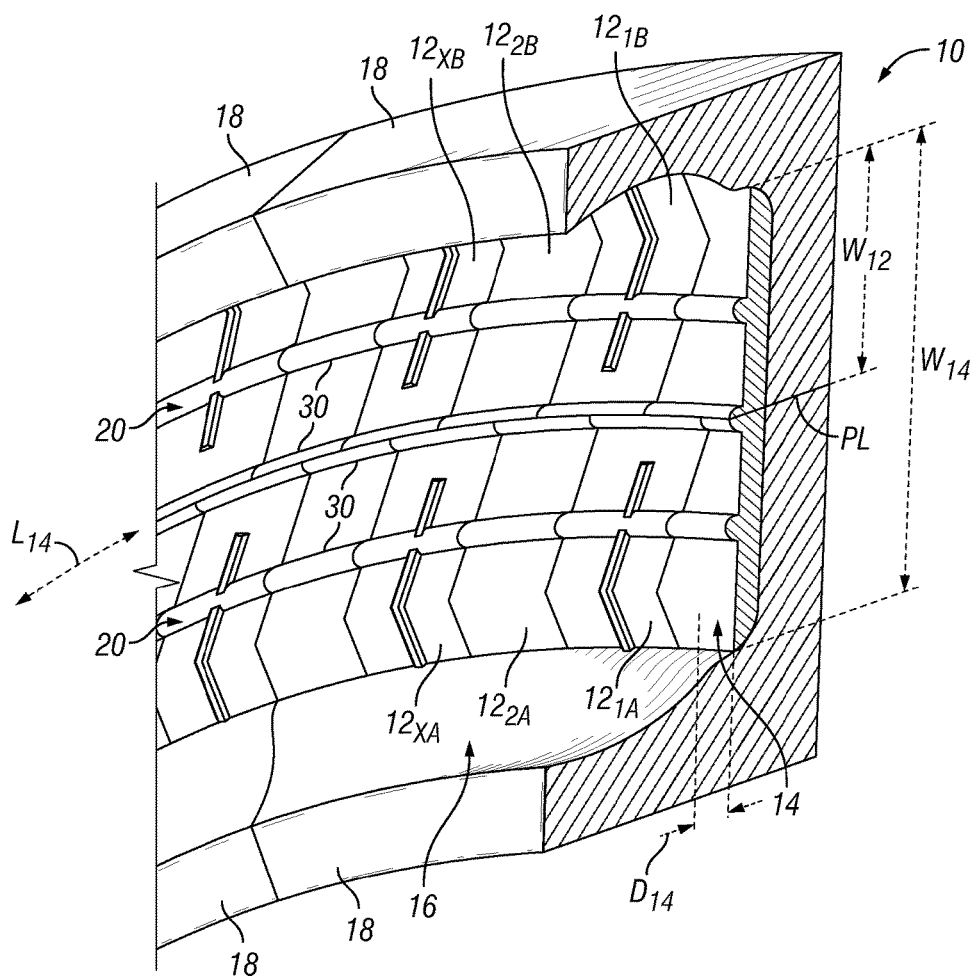
FIG. 1 shows a partial sectioned perspective view of an exemplary tire mold having a plurality of tread-molding elements.

The presently disclosed invention is directed to one or more methods and devices for adjusting, altering and/or correcting one or more plysteer parameters of molded tires. PRAT represents a moment or torque acting on the tire and can be expressed in terms of a plysteer residual lateral force ("PRLF") multiplied by a pneumatic trail of the tire's footprint. PRLF (also referred to herein as plysteer residual cornering force, or "PRCF") represents the resultant or effective lateral force acting along the length of a tire footprint. The pneumatic trail is the distance between the longitudinal centerline of the footprint and the longitudinal location of the PRLF. Therefore, if the PRAT changes, then at least one of the PRLF and the pneumatic trail changes. Accordingly, as presently disclosed, the description of PRAT can be used interchangeably with PRLF (which is also used interchangeably with PRCF) and the pneumatic trail unless specifically noted. Moreover, PRAT, PRLF and PRCF may each be referred to herein as a "plysteer parameter" and collectively as "plysteer parameters" as each parameter contributes to the generation and control of plysteer in a tire.

As disclosed herein, the plysteer parameters (including PRAT) are modified via substitution of one or more removable tread-molding elements within the tire mold to thereby adjust the total plysteer contribution of the mold. As presently disclosed, in some embodiments, elements may be preselected in that a plurality of alternative removable tread-molding elements may be designed and made available for use in the mold to adjust the total plysteer contribution of the mold. By substituting certain tread-molding elements within the mold, the entire mold does not have to be replaced and there is no production delay due to design and manufacture of a new mold.

These plysteer parameters may also be employed to correct conicity as needed. Tire conicity may also impact a tire's tendency to pull laterally, as conicity quantifies a tire's tendency to pull laterally based upon the shape of the tire. This tendency may affect a vehicle's steering performance. Generally, the more conical a tire is shaped, the more conicity is exhibited by the tire (that is, the more lateral pull the tire exhibits). Accordingly, conicity may also be considered in connection with the methods presently described herein.

Due to tire manufacturing processes, one or more of a tire's PRAT, PRLF and pneumatic trail may not be truly known until the tire is molded. While PRAT, as well as the PRLF and the pneumatic trail, can be generated by the arrangement of various components within a tire's construction (sometimes known as a "tire construction plysteer contribution"), PRAT, as well as the PRLF and the pneumatic trail, can also be generated by forming certain features in a tire's tread (known as the "tread plysteer contribution"). It is the sum of all plysteer contributions acting within the tire footprint that generates a corresponding PRAT or PRLF during tire operation.

Accordingly, embodiments of the presently disclosed invention include molds, methods and systems for adjusting one or more of a tire's plysteer parameters. Some embodiments include providing a mold having a plurality of removable tread-molding elements that, together, define a total plysteer contribution of the mold. The removable tread-molding elements (or "tread molding elements") include one or more removable tread-molding elements each having a predetermined plysteer contribution. To form a molded tread, whether as part of a tire or separate from the tire, one or more of the removable tread-molding elements are selectively arranged within the mold to form a molded tread having an outer, tire-operating side (also referred to herein as the "ground-engaging side" of the tread). The tire-operating side of the tread includes exposed surfaces that are configured to engage a ground surface upon which the tire operates (i.e., the ground-engaging side of the tread extends annularly about the tire).

Moreover, the tread includes void features arranged within the tread thickness. The void features may be arranged along the ground-engaging side and may extend into the tread thickness from the ground-engaging side. Void features may include, for example, grooves and sipes. Grooves may extend lengthwise in a lengthwise direction of the tread to form a longitudinal groove, or may extend lengthwise in a widthwise direction of the tread to form a lateral groove. Sipes include a narrow groove or even slit forming a discontinuity within the tread.

By being removable, the tread-molding elements may be arranged in any desired arrangement and replaced as necessary to adjust or alter the total plysteer contribution of the mold (also referred to herein as the "total plysteer of the mold" or "mold plysteer"), which in turn is molded into a tire tread and ultimately used to generate a plysteer parameter in a tire. Any removable tread-molding elements known to one of ordinary skill may be employed. It is understood that all of the plurality of tread-molding elements within the mold, at any time, may or may not be of the same design or have the same plysteer contribution.

A mold may be any type of tire mold used to form a molded tire. A mold may also be any type of tread mold used to form a molded tread. For example, a tread mold may include a retread mold to form a molded tread for later use in manufacturing a retreaded tire. A tread formed in a tread mold may form any tread, including a strip of tread extending lengthwise between opposing ends.

In any mold contemplated herein, one of more tread-molding elements may be arranged in an array to define a tread molding cavity for forming a molded tread, whether in a tire mold or in a tread mold. The array extends along a length of the tread-molding cavity (i.e., in a lengthwise direction of the tread) to define a length of the tread. The tread-molding elements may incorporate one or more designs, which designs may differ subtly or substantially. For example, differently designed tread-molding elements may be used and selectively arranged within the array to control noise generated by the tire during tire operation. For example, each of the differently designed tread molding elements may contain different components for forming different tread void features, or may create different pitches for controlling tire noise generation. Some exemplary effects of selective molding element arrangement are provided in U.S. Serial No. PCT/US13/73467 for "In-Mold Optimization of Force Variation Harmonics," the entire disclosure of which is incorporated by reference herein.

It is understood that the tread-molding elements may extend at least partially across a full width of a tread molding cavity of the mold to form at least a portion of a ground-engaging side of the tread. When extending partially across a width of the tread, a plurality of tread-molding elements may be arranged side-by-side in a laterally adjacent arrangement to form a full width of the tread.

To achieve a desired plysteer parameter in a tire, and more specifically, a desired plysteer parameter in a tire footprint at any given time during tire operation, a mold may be designed with a target or intended total plysteer contribution. The mold may include one or more removable tread-molding elements defining a total plysteer contribution of the mold. In doing so, at least one of the tread-molding elements has a non-zero plysteer contribution (i.e., a plysteer contribution greater or less than zero). It is understood that the plurality of tread-molding elements may include two or more different tread-molding element designs each having a different plysteer contribution. It is also understood that each and every tread-molding element of the plurality of tread-molding elements may not have a plysteer contribution, as one or more of the plurality of tread-molding elements may have no plysteer contribution (that is, a zero plysteer contribution).

In some embodiments, the tread-molding elements may include a preselected or predetermined quantity of differently designed and interchangeable tread-molding elements having different plysteer contributions. Therefore, a mold may have an adjustable range of a plysteer parameter as different tread-molding elements are substituted for one another. For example, the plurality of removable tread-molding elements provided with the mold includes both one or more removable tread-molding elements of a selected design (also referred to as removable tread-molding elements) and one or more removable tread-molding elements of at least one alternative design (also referred to as alternative tread-molding elements). The selected design and the alternative design may have different non-zero plysteer contributions. It is understood the different non-zero plysteer contributions may include any non-zero value. For example, one of the selected and alternative designs may provide negative plysteer contribution, while the other provides a positive plysteer contribution, where negative is less than zero and positive is greater than zero. In particular embodiments, the selected design and the alternative design may have opposite plysteer contributions of equal absolute value. For example, if one of the selected and alternative designs has a PRAT value of X, the opposite PRAT contribution is −X (or X multiplied by negative 1). So if a tread-molding element had a PRAT contribution of −1.0 Newton-meters (N-m), an opposite PRAT contribution would equal 1.0 N-m.

To provide adjustability in each plysteer parameter direction, the plurality of removable tread-molding elements provided with the mold includes, in some embodiments, equal quantities of one or more removable tread elements of a selected design and one or more removable tread elements of an alternative design, each of which is interchangeable. In such a case, the mold contains a 1:1 ratio of tread-molding elements of the selected design to alternative tread-molding elements of the alternative design. In this way, the total plysteer contribution of the mold may be controlled by adjusting the ratio of tread-molding elements of selected and alternative designs. For example, when substituting all of the tread-molding elements of the design with those of the alternative design, the total plysteer contribution may be adjusted to an initial limit or extreme within the adjustable range. Furthermore, when substituting all of the tread-molding elements of the alternative design with those of the first design, the total plysteer contribution may be adjusted to an upper limit or extreme within the adjustable range. It is understood that additional alternative tread-molding elements of any other design may also be employed as a substitute for the tread-molding elements of the selected design or any other tread-molding element of another design forming the plurality of tread-molding elements.

Some embodiments of the presently disclosed methods include forming a tire having a tread formed from the mold.

In such embodiments, a tire may be formed by molding a tire in a tire mold. It doing so, the tread is molded while attached to the tire. It is understood that any method of forming and molding a tire may be employed. For example, a green tire formed of one or more layers of reinforcements and uncured rubber, which may be natural and/or synthetic, may be placed within a tire mold. The green tire may include tread material arranged annularly around an outer circumference of the tire. Once placed within the tire mold, the mold is heated and the green tire placed under pressure to bond the various layers together and form the final, cured tire.

In other embodiments, forming a tire may be performed by molding a tread in a mold comprising a tread mold. The molded tread is subsequently used to form a tire, such as when, for example, forming a retreaded tire. When forming a retreaded tire, a tread is bonded to a pre-cured tire carcass. Any known method of forming a retreaded tire may be employed. For example, a layer of adhesive or cushion gum (which comprises any natural or synthetic rubber) may be applied to the interface between the tread and tire carcass, and the assembly may be placed into a curing envelope and placed under a vacuum. The enveloped assembly may then be placed within a curing vessel (e.g., an autoclave) and heated under pressure to bond the tread to the tire carcass and form a retreaded tire thereby. So long as at least a tread portion of the tire is molded, the tire may be formed by any known method of forming a tire. It is understood that the tire may be any known tire, whether such tire is a pneumatic or non-pneumatic tire.

Further embodiments of such methods include measuring one or more plysteer parameters of a formed tire and determining whether the measured plysteer parameter is greater than, less than or approximately equal to a target plysteer parameter for the tire. The one or more plysteer parameters to be measured and compared include at least one of PRAT, PRLF and PRCF. The measuring and comparing reveals whether the total plysteer contribution of the mold needs to be adjusted to form a tire having a measured plysteer parameter more closely achieving a desired, intended and/or targeted plysteer parameter value.

In some embodiments, the plysteer parameter of the tire (resulting in a measured plysteer parameter for the tire) may be measured as the tire rolls along a ground-surface. An approximate difference is determined between the measured plysteer parameter of the tire and a target plysteer parameter intended for the tire. Because a plysteer parameter is generated through a tire's footprint, a plysteer parameter may continuously change as the tire circumference rolls through the footprint (that is, through the area of contact between the tire and the ground-surface). Therefore, the plysteer parameter of the tire is subject to change as different portions of the tire rolls through the tire footprint.

Accordingly, a plysteer parameter may be intermittently or continuously measured as the tire rolls during operation. In doing so, a constant plysteer parameter or a variable plysteer parameter may be measured around the circumference of the tire. The measured plysteer parameter of the tire may be identified as having an average value operating within a measured range having a maximum and a minimum measured plysteer parameter value. Moreover, the target plysteer parameter value may include a target average plysteer parameter value, a target maximum plysteer parameter value and/or a target minimum plysteer parameter value. The maximum and minimum target plysteer parameter values define a target plysteer parameter value range for the tire.

It is appreciated that in measuring the tire plysteer parameter, it may be determined that only a portion of the tire tread around the circumference of the tire generates a plysteer parameter value different than a target plysteer parameter value desired for the tire. In response, the plysteer contribution of only a certain portion of the tread molding cavity may be altered by replacing particular tread-molding elements therein.

It is understood that any known process or means of measuring one or more plysteer parameters may be employed. Such measured parameters may be compared with one or more target plysteer parameter values for the tire. For example, PRAT may be determined by measuring the torque generated by a tire rotating under a particular vertical load on a test ground surface.

It is noted that the plysteer parameter value of a tire may vary around the tire as the tire tread rolls through the tire footprint. While a mold may form a tread such that the plysteer parameter value measured around the tire is the same, it is understood that variations may remain within a particular tolerance or range. Therefore, the mold may have a total plysteer contribution that is generally constant along the length of the tread molding cavity within a particular tolerance or range to generate a tire tread having a generally constant plysteer contribution along the length of the tread. In doing so, the mold may have an average plysteer contribution along the length of the tread molding cavity, for example within a defined range of PRAT contribution defined by a maximum and a minimum plysteer contribution along any portion of the tread molding cavity length. Likewise, the molded tread and the resulting tire would have an average target plysteer parameter having a particular target range of variation, where the range is defined, for example, by a maximum and a minimum target PRAT.

When the plysteer parameter of the tire is determined to have a value other than a target plysteer parameter of the tire (i.e., greater or less than a target range of the plysteer parameter), adjusting the total plysteer contribution of the mold may include (1) substituting one or more tread-molding elements with at least one other tread-molding element having a smaller plysteer contribution if the measured plysteer parameter of the tire exceeded a target plysteer parameter for the tire (e.g., when the plysteer parameter of the tire is greater than a maximum plysteer parameter value or an average PRAT value targeted for the tire); or (2) substituting one or more tread-molding elements with at least one other tread-molding element having a greater plysteer contribution if the target plysteer parameter of the tire exceeds the measured plysteer parameter for the tire (e.g., when the plysteer parameter of the tire is less than a minimum plysteer parameter value or an average plysteer parameter value targeted for the tire). If it was determined that the total plysteer parameter of the tire was approximately or closely equal to the target plysteer parameter value or a targeted average plysteer parameter value of the tire, and/or that any substitution of an available or preselected tread-molding element would not provide a plysteer parameter value closer to the target plysteer parameter value for the tire, then no substitution is performed. It is understood that the one or more of the tread-molding elements being substituted may have a zero plysteer contribution or a non-zero plysteer contribution.

Because the plurality of tread-molding elements may include elements of different sizes and/or shapes, in substituting tread-molding elements for purposes of altering the total plysteer contribution of the mold, tread-molding elements having different plysteer contributions may be substituted for tread-molding elements of the same size and shape. Accordingly, substitutable tread-molding elements having different plysteer contributions are said to be physically interchangeable.

Once the total plysteer of a mold is adjusted, a subsequent tire may be formed by forming a tire using the adjusted mold and determining whether a plysteer parameter of the tire is greater than, less than, or approximately equal to an intended plysteer parameter value for the tire to ascertain the adjustment to the mold was sufficient or whether further adjustment to the total plysteer contribution is needed or desired.

It is understood that tread-molding elements of different plysteer contributions may be achieved by forming one or more new lateral grooves in a tire tread. In particular, the arrangement of one or more lateral grooves along a width of the tread extending away from a lateral centerline of the tire generates a particular moment around a tire footprint. It is noted that the further a lateral groove is arranged from the tread lateral centerline, the generation of a plysteer parameter increases. Likewise, because the mold is a negative or relief of the tread, the PRAT (or plysteer) contribution of a tread-molding element increases as a lateral groove-molding member is arranged further from a lateral centerline of the mold's tread molding cavity. Accordingly, some embodiments provide that the different plysteer contribution of the alternative removable tread-molding element is achieved by configuring the alternative tread-molding element to form a lateral groove in the tread. It is understood that any lateral groove may extend partially or fully across a width of the tread. Moreover, when providing multiple grooves, the grooves may remain separate and independent or may intersect to form a continuous lateral groove extending at least partially across a width of the tread.

By further example, plysteer contributions may be achieved by adjusting or altering certain features or characteristics of one or more lateral grooves. In particular, a different plysteer contribution in an alternative tread-molding element is achieved by configuring the alternative tread-molding element to form a lateral groove that is different than a lateral groove formed in the tread by the selected removable tread-molding element. The generation of different plysteer contributions by altering the design of lateral grooves is discussed further below in association with the figures.

Referring to the figures, wherein like numbers represent like elements, and with particular reference to FIG. 1, an exemplary tire mold 10 is provided having a plurality of tread-molding elements 12 forming a tread molding cavity 14. In the tire mold, the tread molding cavity forms a portion of the tire molding cavity 16, which is configured to also receive, shape and form other portions of the tire, such as opposing tire side walls. The mold 10 of FIG. 1 is used to form an exemplary tire, such as tire 40 shown in FIG. 2, in accordance with the presently disclosed methods.

Figure 2:
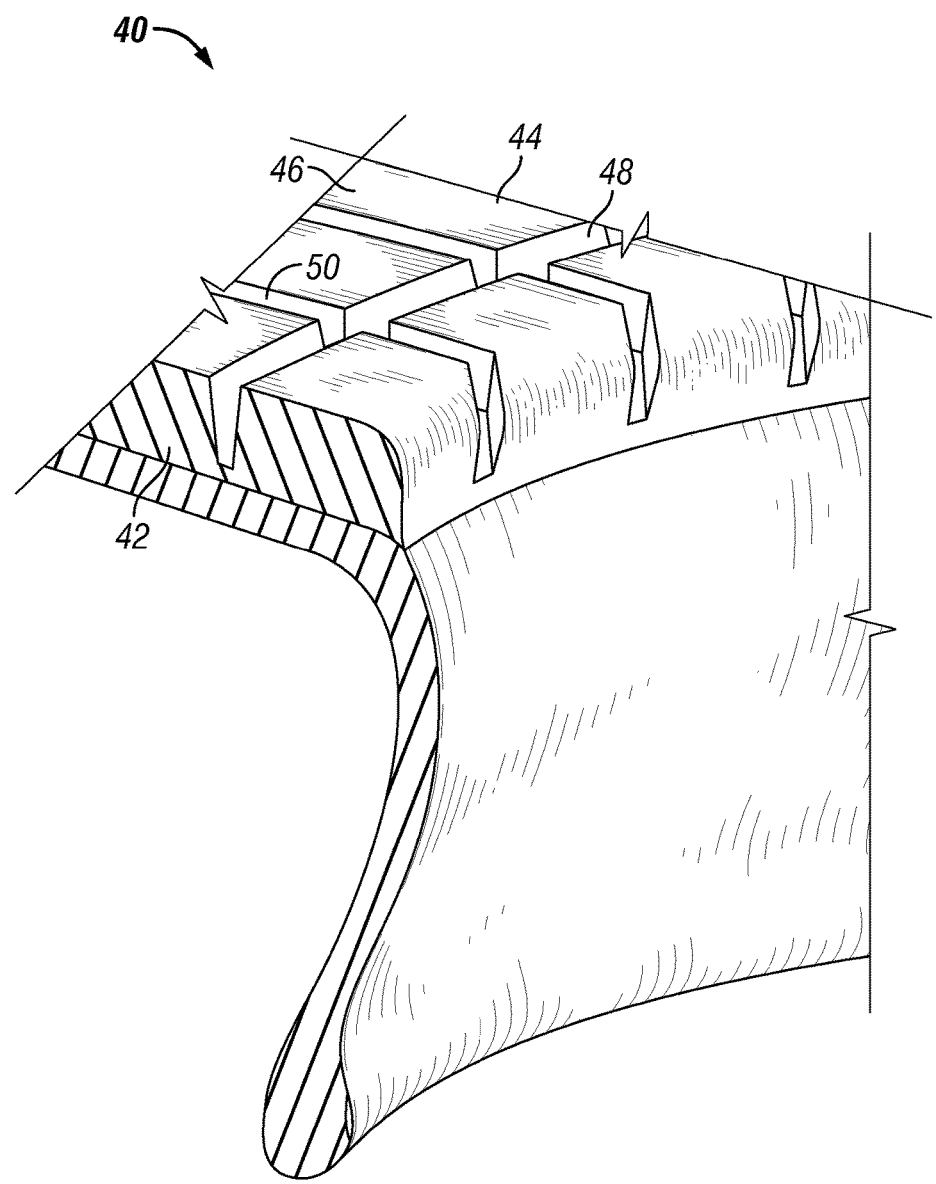
FIG. 2 shows a side perspective view of an exemplary tire formed with the mold of FIG. 1.

Tire 40 includes a tread 42 having an outer, ground-engaging side 44 having ground-engaging surfaces 46. By virtue of being molded with the tire 40, the tread 42 and ground-engaging side 44 have a length extending annularly around the tire. It is noted that mold 10 shown in FIG. 1 includes a longitudinal groove-forming member 30 extending in lengthwise direction of the tread molding cavity 16 for use in forming an exemplary longitudinal groove 48 in the tire tread 42 as shown in FIG. 2. It is understood that tread 42 may exhibit any one of a plurality of configurations without departing from the scope of the present disclosure.

Because the tread molding cavity forms a negative or relief of the tread, when a mold feature is described or defined relative to the tread molding cavity, it is understood that a corresponding tread feature can be described or defined relative to a tread or tire formed by any mold described herein. Furthermore, lengthwise, widthwise and depthwise directions of the tread mutually correspond with respective lengthwise, widthwise and depthwise directions of the tread molding cavity. The lengthwise or longitudinal direction of a tread, for example, extends along a length of the tread parallel to a lateral centerline of the tread. For example, the lengthwise direction may be circumferential when the tread is molded to an annular tire, or may be linear when the tread is molded in a flat tread mold. The widthwise direction of a tread extends laterally along a width of the tread relative the lengthwise direction or length of the tread. The depthwise direction of the tread extends transverse through the tread thickness. The lengthwise, widthwise and depthwise directions extend such that each is perpendicular to the other.

By example, mold 10 is shown as a segmented mold, where the mold cavity is formed by numerous mold sections 18 being radially displaceable during mold opening and closing operations. Nonetheless, any known mold type may be employed. For example, the mold may comprise a clamshell-type mold having opposing halves, where the opposing halves translate axially relative the tire during mold opening and closing operations. It is understood, however, that mold 10 may instead form a tread mold, which may mold a tread having a length extending linearly or annularly. As such, the tread molding cavity may exist without other mold cavity portions configured to receive other portions of a tire.

The tread-molding elements are arranged within the mold to form a length of the tread molding cavity and therefore a length of tread. In some embodiments, the tread-molding elements are arranged in one or more arrays extending along a length, and in a lengthwise direction, of the tread molding cavity. For example, with reference to FIG. 1, a plurality of exemplary tread-molding elements 12 are arranged in a pair of arrays 20. Each array extends in a lengthwise direction $L_{14}$ of the tread molding cavity 14, and in effect a lengthwise direction $L_{14}$ of the molded tread. Arrays 20 are separable along a mold parting line PL.

It is understood that the longitudinal or lengthwise alignment of laterally adjacent tread-molding elements or arrays may vary as desired. With reference to FIG. 1, for example, tread-molding elements 12 may be shifted in a longitudinal direction $L_{14}$ of the tread molding cavity 14. In other embodiments, such as is shown by example in FIGS. 7 and 8, tread-molding elements 12 may be aligned in a longitudinal direction $L_{14}$ of the tread molding cavity such that the entire length of each tread-molding member of the pair is laterally adjacent the other. In other words, laterally adjacent arrays of tread-molding elements may be aligned longitudinally as shown by example in FIGS. 1 and 7.

It is also understood that the plurality of tread-molding elements may be designed such that one or more tread-molding elements are arranged laterally to extend across a full width of the tread molding cavity to mold a full width of the tread. For example, with reference to FIG. 1, each tread-molding element has a width $W_{12}$ such that a plurality of tread-molding elements 12 forms numerous pairs of laterally adjacent tread-molding elements. Each such pair includes a tread-molding element arranged laterally adjacent another tread-molding element to collectively extend across the full width $W_{14}$ of the tread molding cavity 14 for forming a full width of a corresponding tread. Two or more laterally adjacent tread-molding elements may be configured to extend across a full width of the tread molding cavity for forming a full width of a tread. Furthermore, the lateral arrangement of two or more tread-molding elements extending across a full width of the tread molding cavity may include tread-molding elements of the same design, or of two or more different designs. For example, each of two or more tread-molding elements arranged may have the same plysteer contribution, or may have a different plysteer contribution.

As discussed above, at any time, a mold may include a plurality of tread-molding elements of one or more different designs having different plysteer contributions. A tread-molding element having a different plysteer contribution that is interchangeable with another tread-molding element is referred to herein as an alternative tread-molding element. It is understood that more than one alternative tread-molding element design may be provided such that each of the different alternative tread-molding element designs have different, interchangeable plysteer contributions. With reference to FIG. 1, for example, the plurality of tread-molding elements include one or more selected removable tread-molding elements of a first design $12_{1A}$, $12_{1B}$, one or more selected removable tread-molding elements of a second design $12_{2A}$, $12_{2B}$ and one or more alternative tread-molding elements of an alternative design $12_{XA}$, $12_{XB}$.

Accordingly, it can be said that tread-molding element $12_{1A}$ forms one of a pair of tread-molding elements $12_{1A}$, $12_{1B}$ and the alternative tread-molding element $12_{XA}$ forms one of an alternative pair of tread-molding elements $12_{XA}$, $12_{XB}$. The tread-molding elements in each pair may be arranged side-by-side to extend across at least a partial or a substantial full width of the tread molding cavity to form at least a portion of a width of a ground-engaging side of the tread. As such, each alternative tread-molding element $12_{XA}$, $12_{XB}$ may be interchangeable with a corresponding removable tread-molding element $12_{1A}$, $12_{1E}$ in each corresponding array 20. Therefore, because substituting an alternative tread-molding element for a removable tread-molding element, or vice versa, alters the total plysteer contribution for the mold, it is understood that the selected and alternative designs provide different plysteer contributions. For example, one of the selected and alternative designs has a non-zero plysteer contribution while the other may have any other non-zero or zero plysteer contribution. In another example, the alternative design may have a predetermined plysteer contribution with an absolute value equal to the predetermined plysteer contribution of the design being substituted.

Figure 3:
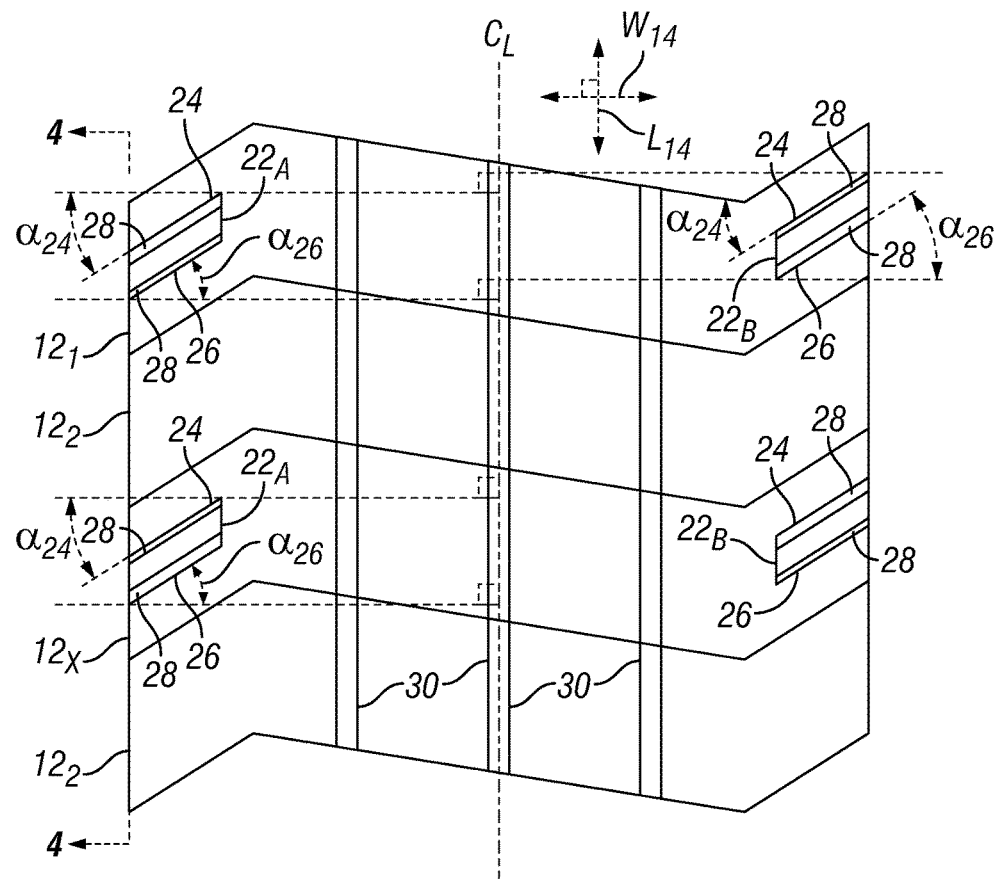
FIG. 3 shows a top view of an exemplary arrangement of a plurality of tread-molding elements for use in the mold of FIG. 1.
Figure 5:
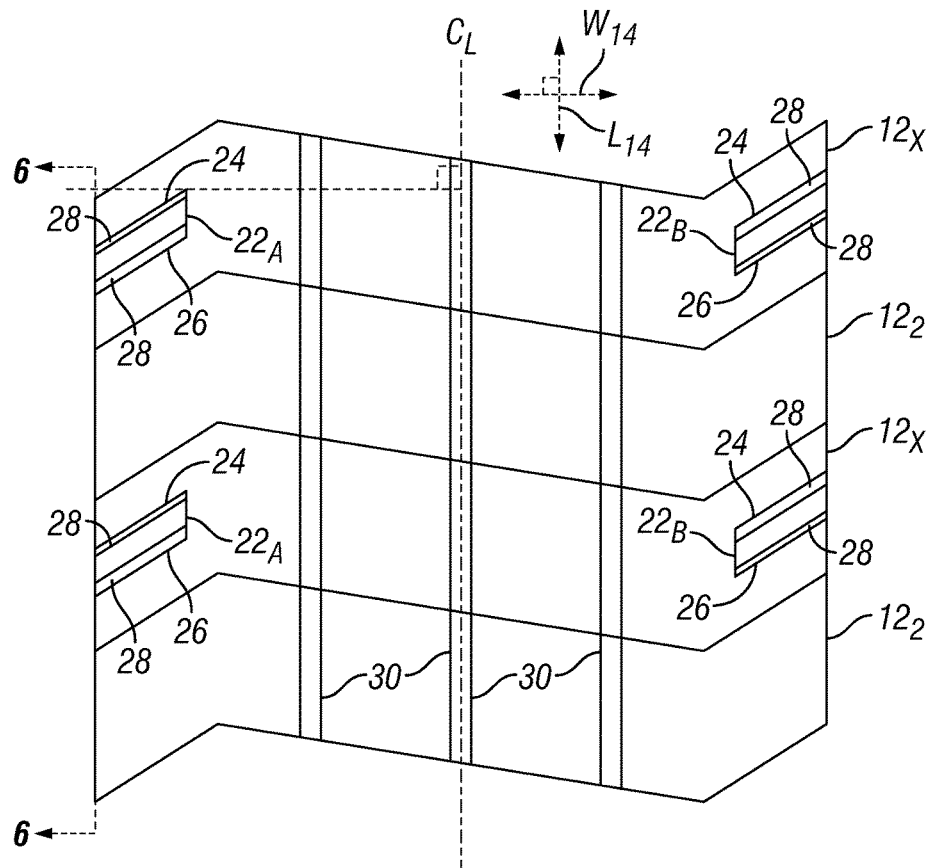
FIG. 5 shows a top view of an exemplary modified arrangement of the tread-molding elements of FIG. 3, where a removable tread-molding element has been substituted with an alternative tread-molding element to provide a different plysteer contribution for the mold to form a tire having a target plysteer parameter.
Figure 6:
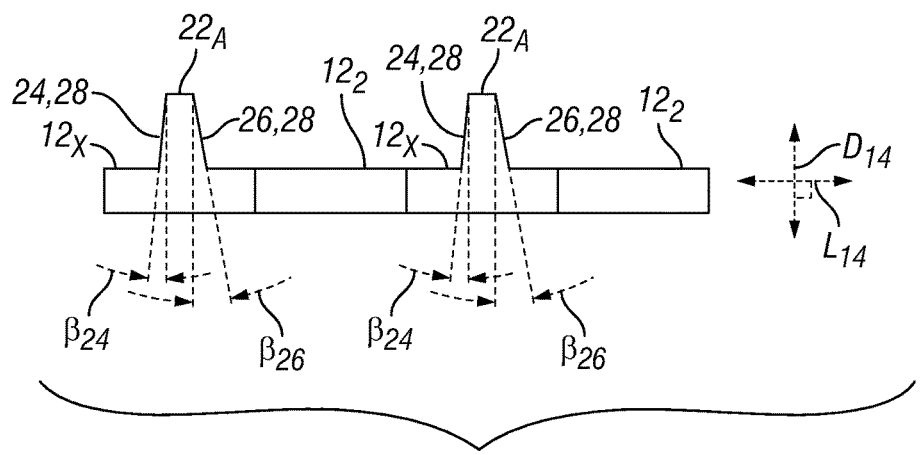
FIG. 6 shows a side end view of the arrangement of FIG. 5 taken along line 6-6.

Adjustment of the total mold plysteer contribution can be further described in association with FIGS. 3 and 5. With reference to FIG. 3, a patterned arrangement of tread-molding elements 12 is shown that is repeated within the mold. The pattern of elements forms a single array or series 20 having a removable tread-molding element $12_1$ of a first design, a removable tread-molding element $12_2$ of a second design, and an alternative tread-molding element $12_X$ of an alternative design. At least elements $12_1$ and $12_2$ provide different plysteer contributions, where the alternative tread-molding element $12_X$ is interchangeable with removable tread-molding element $12_1$. Therefore, to change the total plysteer contribution, one of tread-molding elements $12_1$, $12_X$ may be substituted with the other. With reference now to FIG. 5, removable tread-molding element $12_1$ of the arrangement in FIG. 3 has been replaced with an alternative tread-molding element $12_X$ to alter the total plysteer contribution of the mold. It is understood that multiple alternative designs to removable tread-molding element $12_1$ may be provided each having a different plysteer contribution to further alter the total plysteer contribution of the mold. Moreover, one or more alternative designs to removable tread-molding element $12_2$ of a second design may also be provided to provide further plysteer parameter adjustability for the mold.

It is noted that the mold shown in FIG. 3 includes a plurality of tread-molding elements having equal quantities of selected removable and alternative tread-molding elements $12_1$, $12_X$. As discussed herein, this facilitates equal adjustment of a plysteer parameter in opposite directions (i.e., to increase and decrease the total plysteer parameter) relative to the total plysteer contribution of the mold when the selected removable and alternative tread-molding elements have opposite plysteer contributions.

It is understood that any manner of creating a plysteer contribution, and therefore achieving an alternative design, in a tread-molding element may be employed. For example, plysteer contributions may be generated by adding a lateral groove to a molded tread. A lateral groove has a length extending longitudinally partially or fully across a width of the tread. The lateral groove extends longitudinally in a lateral direction at any angle relative an imaginary line extending perpendicular to the lengthwise or longitudinal direction of the tread. As such, the imaginary line defines a widthwise direction of the tread. It is appreciated that any one or more tread-molding elements may be configured to form such a lateral groove. In particular, a tread-molding element includes a lateral groove-forming member to achieve such purpose. The lateral groove-forming member forms a negative or relief of the groove to be formed, where the tread-molding element is arranged relative the tread molding cavity just as the lateral groove is arranged relative the tread.

A plysteer parameter may be controlled by altering various features of the lateral groove, and therefore altering related features arranged along one or more tread-molding elements. For example, a lateral groove length may be increased or decreased, and/or a lateral groove location may be changed. In another example, a plysteer parameter may be controlled by altering a slope or inclination angle of any side of a pair of sides defining a width of a lateral groove (the pair of sides is also referred to as "first" and "second" sides). Because each side includes one or more side walls, altering the slope or inclination angle of either side alters the slope or inclination angle of a corresponding groove side wall. Accordingly, with respect to the mold, this is achieved by altering any corresponding side of a pair of opposing sides forming a width of the lateral groove-molding member.

Figure 4:
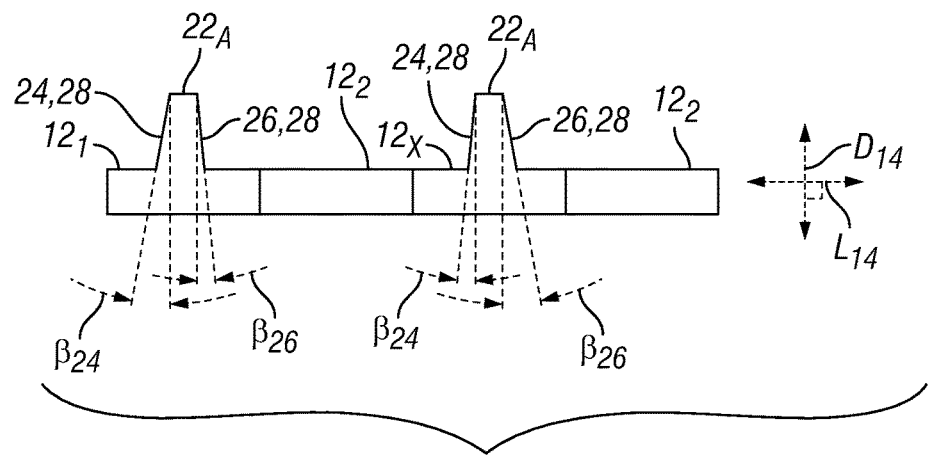
FIG. 4 shows a side end view of the arrangement of FIG. 3 taken along line 4-4.

With specific reference to the embodiment shown in FIGS. 3 and 4, removable tread-molding element $12_1$ has a lateral groove-molding member 22A arranged on a lateral side of the mold and a lateral groove-molding member 22B arranged on another lateral side of the mold. The sides of the mold, and therefore the sides of the tread, are separated by a centerline CL. Each lateral groove-forming member 22A, 22B has opposing sides 24, 26 defining a width of the member and any resulting lateral groove.

Each side 24, 26 includes one or more side walls 28 having a slope defined by an inclination angle $\beta_{24}$, $\beta_{26}$ measured relative to an imaginary line extending in a depthwise direction of the tread molding cavity (see FIG. 4). The depthwise direction extends perpendicular to both a lengthwise direction and a widthwise direction of the tread molding cavity, where the widthwise direction extends perpendicular to the lengthwise direction. For reference purposes, side 24 forms a leading side and side 26 forms a trailing side of a lateral groove formed in a tire tread. As a tire rolls, the leading side is the first portion of the lateral groove to enter into an area of contact between a tire and a ground-engaging surface, while the trailing side of the lateral groove is the last side of the pair of sides to enter into the area of contact. The area of contact may also be referred to as the contact patch or the tire footprint.

An exemplary embodiment as shown in FIGS. 3 and 4 provides tread-molding elements of different designs. As further shown in FIG. 4, leading side inclination angles $ß_{24}$ and trailing side inclination angles $ß_{26}$ for each lateral groove-forming member $22_A$, $22_B$ are different, to thereby provide different plysteer contributions for tread-molding elements $12_1$, $12_X$. It is noted that in providing different plysteer contributions, only the leading side or trailing side inclination angles may vary between lateral groove-forming members $22_A$, $22_B$, if both lateral groove-forming members are provided.

It is understood that tread-molding element designs may differ by any desired plysteer parameter value as desired. For example, with continued reference to FIGS. 3 and 4, a plysteer contribution of removable tread-molding element $12_1$ may be opposite in value to a plysteer contribution of alternative tread-molding element $12_X$. While this may be achieved by changing any of a variety features between the elements $12_1$, $12_X$, in the embodiment shown, opposite plysteer contributions may also be achieved by providing the same, but oppositely arranged, inclination angles between lateral groove-forming members 22A, 22B. In particular, for each element $12_1$, $12_X$, a leading side inclination angle $ß_{24}$ of lateral groove-forming member $22_A$ and trailing side inclination angle $ß_{26}$ of groove-forming member $22_B$ are equal in absolute value. Likewise, trailing side inclination angle $ß_{26}$ of lateral groove-forming member $22_A$ and leading side inclination angle $ß_{24}$ of groove-forming member $22_B$ are equal in absolute value.

In other exemplary embodiments, a plysteer parameter may be controlled by varying a direction by which a lateral groove (or any side thereof defining a width of the groove) extends laterally along a width of the tread. Thus, a plysteer parameter may be controlled by varying an angle by which any one or more lateral grooves deviates from an imaginary reference line extending in widthwise direction of the tread (i.e., where the imaginary reference line extends perpendicular to a longitudinal direction and a depthwise direction of the tread).

Figure 7:
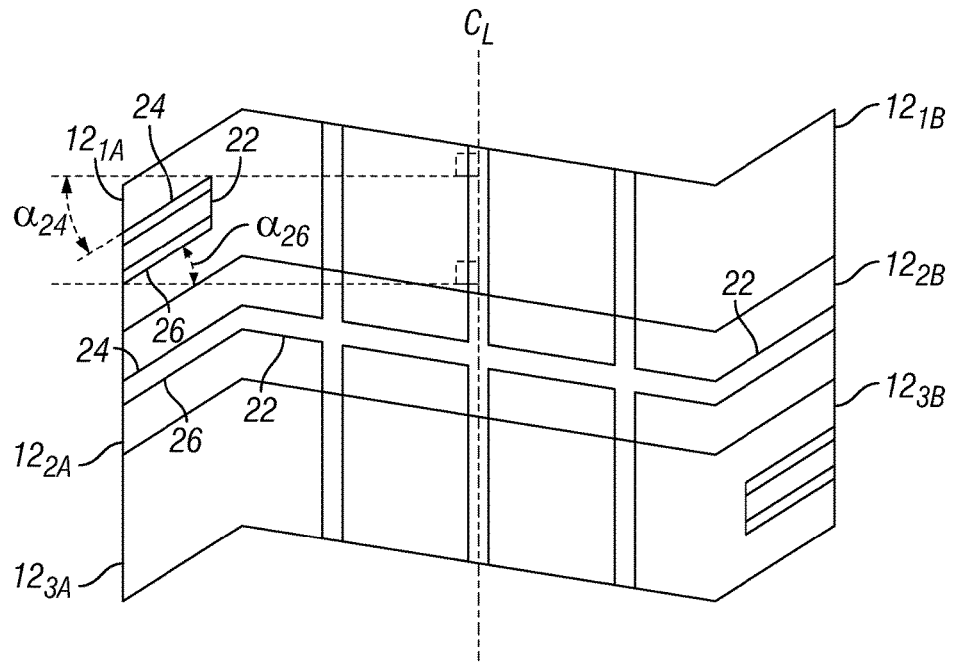
FIG. 7 shows a top view of an exemplary arrangement of a plurality of tread-molding elements for use in the mold of FIG. 1.

In an exemplary embodiment as shown in FIG. 7, various tread-molding elements are provided. The tread-molding elements may include numerous pairs of laterally adjacent tread-molding members, namely, a first pair $12_{1A}$, $12_{1B}$, a second pair $12_{2A}$, $12_{2B}$, and a third pair $12_{3A}$, $12_{3B}$. It is noted that the first and third pairs include only one lateral groove-forming member 22 extending partially across a width of the tread molding cavity and arranged on one of the lateral sides of the tread molding cavity. The second pair $12_{2A}$, $12_{2B}$ of tread-molding members together forms a single lateral groove extending longitudinally across the full width of the tread molding cavity.

Figure 8:
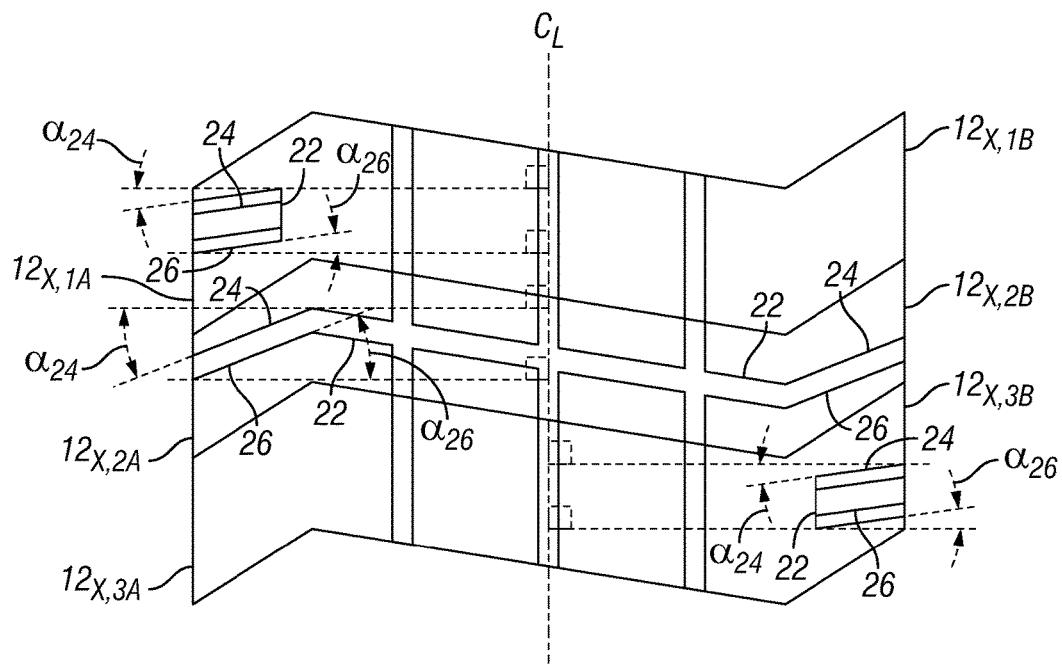
FIG. 8 shows a top view of an exemplary modified arrangement of the tread-molding elements of FIG. 7, where a removable tread-molding element has been substituted with an alternative tread-molding element to provide a different total plysteer contribution for the mold to form a tire having a target plysteer parameter.
Figure 9A:
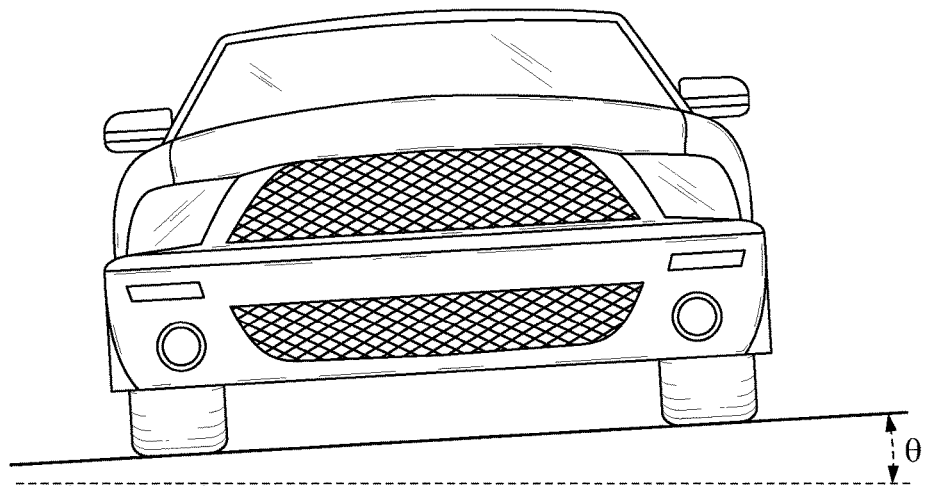
FIGS. 9(A) and 9(B) show variance in a road crown in a right-hand-side driving region and a left-hand-side driving region, respectively.
Figure 9B:
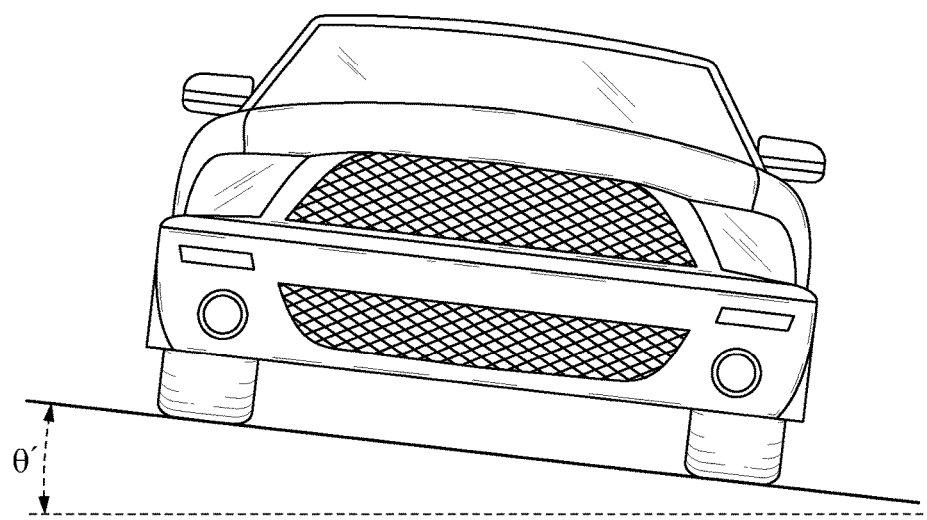

With reference to FIG. 8, the plysteer contribution of the mold in FIG. 7 is adjusted by altering an angle by which each of the lateral groove-forming members extends longitudinally relative a widthwise direction of the tread molding cavity. Altering the plysteer contribution may be accomplished by altering the angle $α_{24}$, $α_{26}$ by which any side 24, 26 of a lateral groove-forming member extends longitudinally across a width of the tread molding cavity. This may be achieved by substituting tread-molding elements $12_{1A}$, $12_{2A}$, $12_{2B}$, and $12_{3B}$ with respective alternative tread-molding elements $12_{X,1A}$, $12_{X,2A}$, $12_{X,2A}$, and $12_{X,3B}$. It is noted that, in some embodiments, the length of each lateral groove-forming member could have been altered. Also, it is understood that one or more lateral grooves may have been added to any element, such as elements $12_{1B}$ and $12_{3A}$. It is further understood that the inclination of any side of a lateral groove-forming member may be altered.

The presently disclosed invention contemplates adjustment of the total plysteer contribution of the mold by substitution of one or more removable tread-molding elements with at least one alternative removable tread-molding element, the latter having a plysteer contribution that differs from the plysteer contribution of each removable tread-molding element being substituted. To control plysteer, removable tread-molding elements having different plysteer contributions may be employed. In this manner, the total plysteer contribution of a mold may be adjusted as desired and according to any known method when the plysteer parameter of a tire sufficiently deviates from a target plysteer parameter characterization for the tire.

Example

Figure 10:
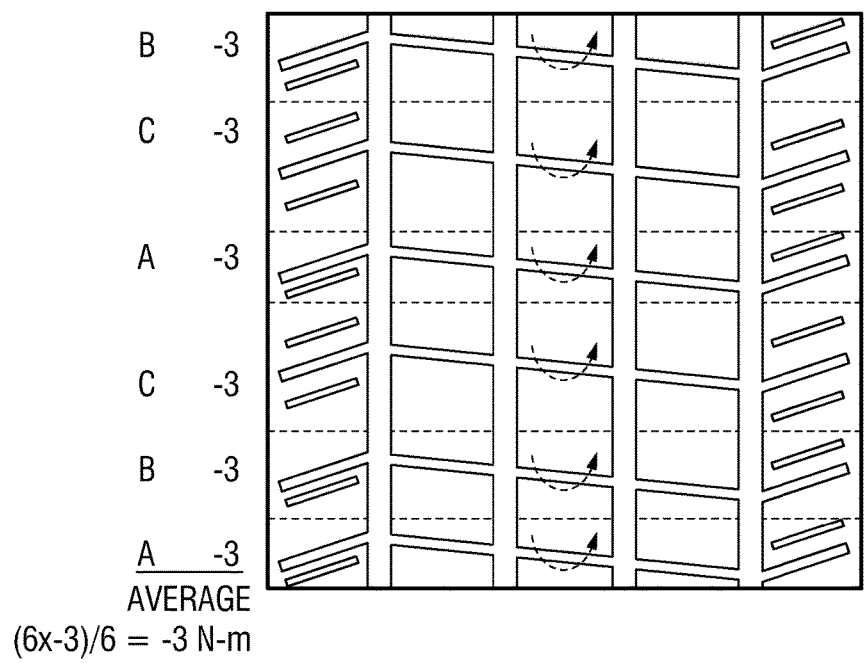
FIG. 10 shows an exemplary prior art mold arrangement having elements with equal PRAT contribution.

A first mold (or "reference") is provided as shown in FIG. 10 having exemplary elements A, B, C with equal PRAT contribution. Therefore, PRAT for ABCACB=−3 N-m with each element contributing approximately −3 N-m.

Figure 11:
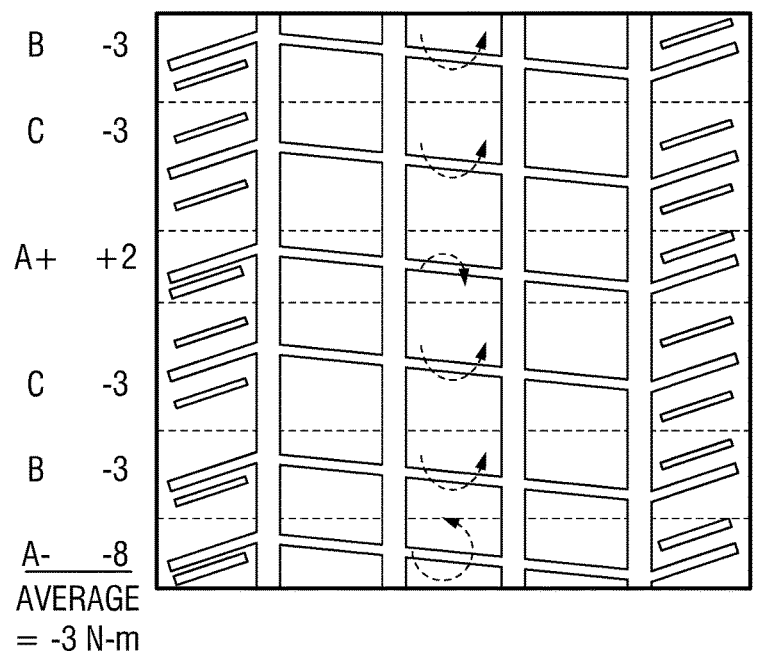
FIG. 11 shows an exemplary mold arrangement having elements with unequal PRAT contribution as presently disclosed.

A second mold is provided as shown in FIG. 11 with the A elements replaced by equal numbers of A⁻ elements at −8 N-m and A⁺ elements at +2 N-m. The A⁺ and A⁻ elements were designed with ±6° Psi 3 as compared with the reference. The B and C elements each contribute −3 N-m. Therefore, PRAT for A⁻BCA⁺CB=−3 N-m.

Thus, while both exemplary molds have the same PRAT, the second mold may be easily altered to attain a desired PRAT value. Additional A⁺ and A⁻ elements may be constructed to permit a range of combinations. It is understood that the molds are not limited to the three elements shown herein and that the PRAT (and other plysteer) contributions of selected elements are not limited to the values provided herein. Such combinations and values are provided by way of example to illustrate that an existing mold can be modified easily without detriment to production capacity. Alterations may be made throughout a mold's lifetime to attain one or more desired plysteer parameters, such as PRAT.

Example

Figure 12:
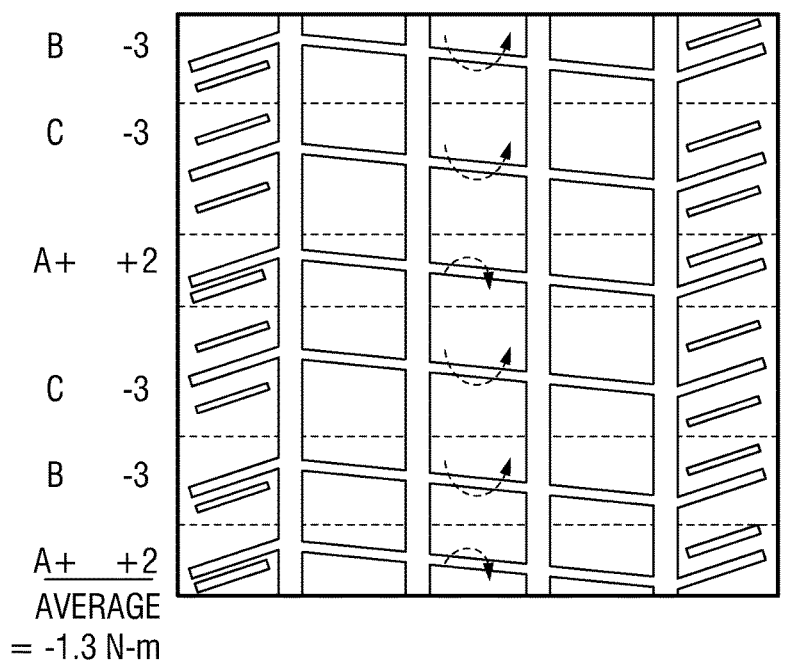
FIGS. 12 and 13 show exemplary variations of the mold arrangement of FIG. 11.

A first exemplary alteration of the mold arrangement of FIG. 11 is shown in FIG. 12. To effect a full positive PRAT adjustment, exemplary element A⁻ at −8 N-m is replaced by exemplary element A⁺ at +2 N-m. The B and C elements each contribute −3 N-m. Therefore, PRAT for A⁺BCA⁺CB=−1.3 N-m.

Example

Figure 13:
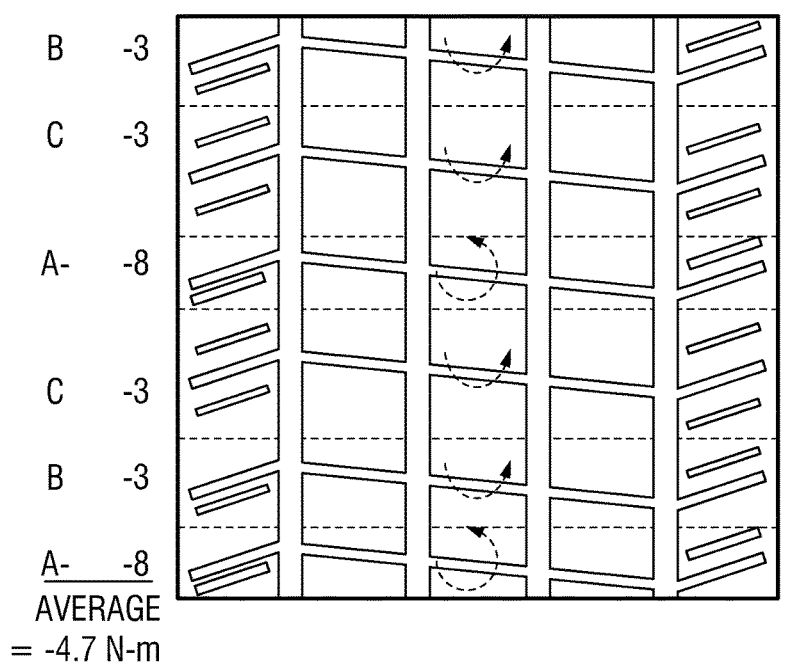

A second exemplary alteration of the mold arrangement of FIG. 11 is shown in FIG. 13. To effect a full negative PRAT adjustment, exemplary elements A⁺ at +2 N-m are replaced by equal numbers of exemplary elements A⁻ at −8 N-m. The B and C elements each contribute −3 N-m. Therefore, PRAT for A⁻BCA⁻CB=−4.7 N-m.

Therefore, tread-molding elements of having different plysteer contributions may be exchanged for one another to adjust or alter the total plysteer contribution of the mold. Such exchange (or addition, subtraction or substitution) may be effected only along a portion of the mold. In doing so, while it is appreciated that more than one tread-molding element may replace a single tread-molding element, a single tread-molding element may replace a single tread-molding element of a different design. In methods of adjusting a plysteer parameter in a tire, the total plysteer contribution of the mold may be increased or decreased as necessary to arrive at a total plysteer for the mold to obtain a plysteer parameter value for the tire that is equal to, approximately equal to or otherwise closely representing the targeted or intended plysteer parameter value for a tire.

In a system for adjusting one or more plysteer parameters in a tire having a tread formed from a mold, at least one mold as presently disclosed nay be provided. Each such mold may include a tread-molding cavity along at least a portion of which a series of interchangeable tread-molding elements is arranged. Substitution of at least one or more removable tread-molding elements with at least one alternative removable tread-molding element can effect adjustment of the total plysteer contribution of the mold. In such a system, any selected removable tread-molding element may interchangeable with one or more non-selected alternative removable element. Such a system may include one or mold stations having a mold thereat for performing the presently disclosed methods. A system incorporating multiple mold stations may combine the presently disclosed molds and methods with other varieties of molds and molding methods. Such a combination may augment production capacity while mold adjustments are effected as presently taught herein.

It is also contemplated that the presently disclosed invention provides a modifiable mold method, apparatus and system in which only portions of an existing mold need to be adjusted to achieve overall desired harmonic distribution. Tire noise sequences may be modified based upon preferred characteristics of the tire noise generated by selected tread-molding elements. It is therefore possible to reduce the amplitude of noise producing peaks as displayed by the frequency spectrum of the tire and to distribute this energy over a wide frequency band (i.e., to approach "white noise"). As variations are created in the elements (i.e., the pitch), the pitches can be arranged to account for torsional vibration and attenuate tread noise associated therewith. Substituting (or adding, subtracting and/or exchanging) at least one of the one or more removable tread-molding elements with at least one alternative removable tread-molding element may thereby effect adjustment of at least one tire noise sequence formed thereby. Thus, in going around the circumference of the tire, the pitch division sequence may be selectively arranged to attenuate resonance attributable to pitch vibration. One element may be different from a neighboring element, and/or a pattern may differ from a neighboring pattern. For example, neighboring patterns may differ in the number of elements in each pattern and/or the arrangement of elements in each pattern. This may be attained without sacrificing necessary plysteer parameters and without incurring investments of new molds when such parameters require adjustment, either together with, or apart from, adjustments in acoustic performance.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. Also, some steps may be optional and may be omitted. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A mold for adjusting one or more plysteer parameters in a tire having a tread formed from the mold, comprising:
 a plurality of tread-molding elements defining a total plysteer contribution of the mold, comprising:
 at least one or more removable tread-molding elements with each element having a predetermined plysteer contribution; and
 at least one alternative removable tread-molding element having a predetermined plysteer contribution that differs from the predetermined plysteer contribution of the one or more removable tread-molding elements;
 wherein substitution of at least one of the one or more removable tread-molding elements with at least one alternative removable tread-molding element effects adjustment of the total plysteer contribution of the mold.

2. The mold of claim 1, wherein a measured plysteer parameter of the tire is compared with a target plysteer parameter for the tire, and the one or more plysteer parameters to be measured and compared include at least one of plysteer residual aligning torque, plysteer residual lateral force and plysteer residual corning force.

3. The mold of claim 2, comprising interchangeable tread-molding elements wherein:

a plysteer contribution of one of the one or more removable tread-molding elements and the at least one alternative removable tread-molding element increases the total plysteer contribution of the mold; and a plysteer contribution of another of the one or more removable tread-molding elements and the at least one alternative removable tread-molding element decreases the total plysteer contribution of the mold.

4. The mold of claim 3, wherein:

one or more of the removable tread-molding elements is substituted with at least one alternative removable tread-molding element having a smaller plysteer contribution if the measured plysteer parameter of the tire exceeds the target plysteer parameter; and one or more of the removable tread-molding elements is substituted with at least one alternative removable tread-molding element having a greater plysteer contribution if the target plysteer parameter of the tire exceeds the measured plysteer parameter.

5. The mold of claim 3, wherein:

a plysteer contribution of one of the one or more removable tread-molding elements and the at least one alternative removable tread-molding element includes a negative plysteer contribution; and a plysteer contribution of another of the one or more removable tread-molding elements and the at least one alternative removable tread-molding element includes a positive plysteer contribution.

6. The mold of claim 5, wherein the predetermined plysteer contribution of the at least one alternative removable tread-molding element has an absolute value equal to the predetermined plysteer contribution of each the one or more removable tread-molding elements being substituted.

7. The mold of claim 3, wherein substitution of at least one of the one or more removable tread-molding elements with at least one alternative removable tread-molding element effects adjustment of at least one tire noise sequence formed by the one or more removable tread-molding elements and the at least one alternative removable tread-molding element.

8. The mold of claim 2, wherein the at least one alternative removable tread-molding element is configured to form a lateral groove in the tread.

9. The mold of claim 8, wherein the least one alternative removable tread-molding element is configured to form a lateral groove in the tread that is different than a lateral groove formed in the tread by the one or more removable tread-molding elements.

10. The mold of claim 9, wherein a difference between lateral grooves configured to be formed by the one or more removable tread-molding elements and lateral grooves to be formed by the at least one alternative removable tread-molding element is effected by one of:

varying an angle by which each lateral groove deviates from an imaginary reference line extending in a widthwise direction of the tread and normal to a lateral centerline of the tread; and varying an inclination angle of at least one groove side wall of a pair of groove side walls arranged on opposing sides of a lateral groove, with the inclination angle measured from an imaginary reference line extending in a depthwise direction of a tread thickness and normal to both a lengthwise direction and a widthwise direction of the tread.

11. The mold of claim 9, wherein:

each of the one or more removable tread-molding elements and the at least one alternative removable tread-molding element is configured to form a lateral groove on one of a lateral centerline of the tread and extending at least partially across a width thereof, and another lateral groove on another side of the lateral centerline and extending at least partially across a width thereof; and at least one of the lateral grooves formed by the one or more removable tread-molding elements is different from corresponding lateral grooves formed by the at least one alternative removable tread-molding element.

12. The mold of claim 9, wherein each of the one or more removable tread-molding elements and the at least one alternative removable tread-molding element extends partially across a full width of a tread molding cavity to form at least a portion of a ground-engaging side of the tread.

13. The mold of claim 12, wherein the one or more removable tread-molding elements forms at least a pair of tread-molding elements and the at least one alternative removable tread-molding element forms at least a pair of alternative tread-molding elements, and wherein the tread-molding elements of each pair are successively arranged to extend across a substantial full width of the tread molding cavity and thereby form at least a portion of a ground-engaging side of the tread.

14. The mold of claim 12, wherein the lateral grooves of the at least one alternative removable tread-molding element intersect to form a continuous lateral groove.

15. A method for adjusting one or more plysteer parameters in a tire, comprising:

providing at least one mold according to claim 1;

forming at least one tire having a tread formed from the mold;

determining one or more measured plysteer parameters of the tire;

comparing the one or more measured plysteer parameters with corresponding target plysteer parameters for the tire; and if the one or more measured plysteer parameters differ from the corresponding target plysteer parameters, adjusting the total plysteer contribution of the mold by substituting at least one of the one or more removable tread-molding elements with at least one alternative removable tread-molding element.

16. The method of claim 15, wherein the one or more plysteer parameters to be measured and compared include at least one of plysteer residual aligning torque, plysteer residual lateral force and plysteer residual corning force.

17. The method of claim 16, further comprising providing interchangeable tread-molding elements wherein:

a plysteer contribution of one of the one or more removable tread-molding elements and the at least one alternative removable tread-molding element increases the total plysteer contribution of the mold; and a plysteer contribution of another of the one or more removable tread-molding elements and the at least one alternative removable tread-molding element decreases the total plysteer contribution of the mold.

18. The method of claim 17, further comprising:

if the measured plysteer parameter of the tire exceeds the target plysteer parameter, substituting one or more of the removable tread-molding elements with at least one alternative removable tread-molding element having a smaller plysteer contribution; and if the target plysteer parameter of the tire exceeds the measured plysteer parameter, substituting one or more of the removable tread-molding elements with at least one alternative removable tread-molding element having a greater plysteer contribution.

19. The method of claim 17, wherein:
a plysteer contribution of one of the one or more removable tread-molding elements and the at least one alternative removable tread-molding element includes a negative plysteer contribution; and
a plysteer contribution of another of the one or more removable tread-molding elements and the at least one alternative removable tread-molding element includes a positive plysteer contribution.

20. The method of claim 19, wherein the at least one alternative removable tread-molding element has a predetermined plysteer contribution with an absolute value equal to the predetermined plysteer contribution of each of the one or more removable tread-molding elements being substituted.

21. The method of claim 17, wherein substituting at least one of the one or more removable tread-molding elements with at least one alternative removable tread-molding element effects adjustment of at least one tire noise sequence formed by the one or more removable tread-molding elements and the at least one alternative removable tread-molding element.

22. The method of claim 16, further comprising configuring the at least one alternative removable tread-molding element to form a lateral groove in the tread.

23. The method of claim 22, wherein configuring the least one alternative removable tread-molding element includes at least one of:
forming a lateral groove in the tread that is different than a lateral groove formed in the tread by the one or more removable tread-molding elements;
configuring a difference between lateral grooves to be formed by the one or more removable tread-molding elements and lateral grooves to be formed by the at least one alternative removable tread-molding element by one of:
varying an angle by which each lateral groove deviates from an imaginary reference line extending in a widthwise direction of the tread and normal to a lateral centerline of the tread; and
varying an inclination angle of at least one side wall of a pair of side walls arranged on opposing sides of a lateral groove, with the inclination angle measured from an imaginary reference line extending in a depthwise direction of a tread thickness and normal to both a lengthwise direction and a widthwise direction of the tread.

24. The method of claim 23, further comprising configuring each of the one or more removable tread-molding elements and the at least one alternative removable tread-molding element to form a lateral groove on a side of a lateral centerline of the tread and extending at least partially across a width thereof, and another lateral groove on another side of the lateral centerline and extending at least partially across a width thereof; wherein at least one of the lateral grooves formed by the one or more removable tread-molding elements is different from corresponding lateral grooves formed by the at least one alternative removable tread-molding element.

25. The method of claim 23, wherein each of the one or more removable tread-molding elements and the at least one alternative removable tread-molding element extends at least partially across a full width of a tread molding cavity to form at least a portion of a ground-engaging side of the tread.

26. The method of claim 25, further comprising:
forming at least a pair of tread-molding elements with the one or more removable tread-molding elements; and
forming at least a pair of alternative tread-molding elements with the at least one alternative removable tread-molding element;
wherein the tread-molding elements of each pair are successively arranged to extend across a substantial full width of the tread molding cavity and thereby form at least a portion of a ground-engaging side of the tread.

27. The method of claim 25, wherein the lateral grooves of the at least one alternative removable tread-molding element intersect to form a continuous lateral groove.

28. The method of claim 18, further comprising repeating the adjustment of interchangeable tread-molding elements until a measured plysteer parameter is approximately equal to a target plysteer parameter for the tire.

29. A system for adjusting one or more plysteer parameters in a tire having a tread formed from a mold, comprising:
at least one mold according to claim 1 with each mold having a tread-molding cavity along at least a portion of which a series of interchangeable tread-molding elements is arranged such that substitution of at least one or more removable tread-molding elements with at least one alternative removable tread-molding element effects adjustment of the total plysteer contribution of the mold.

30. The system of claim 29, wherein any selected removable tread-molding element is interchangeable with one or more non-selected alternative removable elements.

31. A mold for adjusting one or more plysteer parameters in a tire having a tread formed from the mold, comprising:
a plurality of tread-molding elements defining a total plysteer contribution of the mold, comprising:
at least one or more removable tread-molding elements with each element having a predetermined plysteer contribution; and
at least one alternative removable tread-molding element having a predetermined plysteer contribution that differs from the predetermined plysteer contribution of the one or more removable tread-molding elements;
wherein:
substitution of at least one of the one or more removable tread-molding elements with at least one alternative removable tread-molding element effects adjustment of the total plysteer contribution of the mold;
a measured plysteer parameter of the tire is compared with a target plysteer parameter for the tire, and the one or more plysteer parameters to be measured and compared include at least one of plysteer residual aligning torque, plysteer residual lateral force and plysteer residual corning force;
a plysteer contribution of one of the one or more removable tread-molding elements and the at least one alternative removable tread-molding element increases the total plysteer contribution of the mold;
a plysteer contribution of another of the one or more removable tread-molding elements and the at least one alternative removable tread-molding element decreases the total plysteer contribution of the mold; and
substitution of at least one of the one or more removable tread-molding elements with at least one alternative removable tread-molding element effects adjustment of at least one tire noise sequence formed by the one or more removable tread-molding elements and the at least one alternative removable tread-molding element.

\* \* \* \* \*